United States Patent
Ji et al.

(10) Patent No.: US 11,399,347 B2
(45) Date of Patent: Jul. 26, 2022

(54) INDICATION INFORMATION SENDING METHOD, INDICATION INFORMATION RECEIVING METHOD, DEVICE, AND SYSTEM

(71) Applicant: HUAWEI TECHNOLOGIES CO., LTD., Guangdong (CN)

(72) Inventors: Tong Ji, Beijing (CN); Zhe Jin, Beijing (CN); Weiliang Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/686,198

(22) Filed: Nov. 17, 2019

(65) Prior Publication Data

US 2020/0084730 A1    Mar. 12, 2020

Related U.S. Application Data

(63) Continuation of application No. PCT/CN2018/086588, filed on May 11, 2018.

(30) Foreign Application Priority Data

May 17, 2017    (CN) .......................... 201710349785.7

(51) Int. Cl.
*H04W 52/24* (2009.01)
*H04W 52/10* (2009.01)
(Continued)

(52) U.S. Cl.
CPC ......... *H04W 52/246* (2013.01); *H04W 52/10* (2013.01); *H04W 52/146* (2013.01);
(Continued)

(58) Field of Classification Search
CPC . H04W 52/10; H04W 52/146; H04W 52/241; H04W 52/243; H04W 52/245;
(Continued)

(56) References Cited

U.S. PATENT DOCUMENTS

2014/0133449 A1* 5/2014 Xu ...................... H04W 52/346
370/329
2015/0043413 A1* 2/2015 Haim .................... H04W 52/34
370/311
(Continued)

FOREIGN PATENT DOCUMENTS

CN    101192858 A    6/2008
CN    104509180 A    4/2015
(Continued)

OTHER PUBLICATIONS

R1-1709672 Huawei, HiSilicon,"On uplink power control for Rel-13 NB-IoT",3GPP TSG RAN1 Meeting #89,Hangzhou, China, May 15-19, 2017,total 6 pages.
(Continued)

*Primary Examiner* — Ankur Jain
(74) *Attorney, Agent, or Firm* — Paul Christopher Hashim

(57) ABSTRACT

An indication information sending method includes that a base station generates first indication information, and send the first indication information to a terminal device; and where the first indication information is used to indicate a power control manner of a first channel, the power control manner of the first channel is one power control manner in a power control manner set, and the power control manner set comprises a transmit power of a signal on the first channel is determined by a terminal device based on a first parameter; or a transmit power of a signal on the first channel is determined by a terminal device according to a rule predefined on the terminal device.

28 Claims, 4 Drawing Sheets

(51) Int. Cl.
*H04W 52/14* (2009.01)
*H04W 52/26* (2009.01)
*H04W 52/36* (2009.01)
*H04W 52/54* (2009.01)

(52) U.S. Cl.
CPC ....... *H04W 52/241* (2013.01); *H04W 52/243* (2013.01); *H04W 52/245* (2013.01); *H04W 52/248* (2013.01); *H04W 52/262* (2013.01); *H04W 52/367* (2013.01); *H04W 52/54* (2013.01)

(58) Field of Classification Search
CPC ............ H04W 52/246; H04W 52/248; H04W 52/262; H04W 52/367; H04W 52/54; H04W 56/00; H04W 72/0453; H04W 72/085; H04W 72/121; H04W 74/08; H04W 52/14; H04W 52/18; H04W 52/24; H04W 52/38; H04W 52/50; H04W 72/04; H04W 72/0473; H04W 72/042; H04W 74/0833; H04L 5/001; H04L 5/0053; H04L 5/0091; H04L 12/189; H04L 27/2626; H04L 27/2634; H04L 27/361; H04L 27/36; H04L 43/16; H04L 5/00; H04B 7/005
See application file for complete search history.

(56) References Cited

U.S. PATENT DOCUMENTS

| | | | | |
|---|---|---|---|---|
| 2015/0271761 | A1* | 9/2015 | Park ................. | H04W 72/1242 370/329 |
| 2015/0326995 | A1* | 11/2015 | Li ...................... | H04W 72/042 370/329 |
| 2016/0100434 | A1* | 4/2016 | Chen .................... | H04W 52/50 370/329 |
| 2017/0339648 | A1* | 11/2017 | Wang ................. | H04W 52/146 |
| 2018/0049053 | A1* | 2/2018 | Kaikkonen ........... | H04W 24/10 |
| 2018/0206271 | A1* | 7/2018 | Chatterjee ......... | H04W 74/0833 |

FOREIGN PATENT DOCUMENTS

| | | |
|---|---|---|
| CN | 105637969 A | 6/2016 |
| CN | 106304298 A | 1/2017 |
| EP | 2739094 A1 | 6/2014 |
| JP | 2015050575 A | 3/2015 |
| KR | 20140071482 A | 6/2014 |
| RU | 2571874 C2 | 12/2015 |
| WO | 2016057224 A1 | 4/2016 |
| WO | 2016072704 A1 | 5/2016 |
| WO | 2017014715 A1 | 1/2017 |
| WO | 2017076458 A1 | 5/2017 |

OTHER PUBLICATIONS

XP051080724 R1-162780 Ericsson,"NB-IoT-Remaining issues for random access procedure",3GPP TSG RAN WG1 Meeting #84bis,Busan. Korea, Apr. 11-15, 2016,total 4 pages.
3GPP TS 36.213 V14.5.0 (Dec. 2017),3rd Generation Partnership Project;Technical Specification Group Radio Access Network;Evolved Universal Terrestrial Radio Access (E-UTRA);Physical layer procedures(Release 14),total 462 pages.
XP051177504 R2-167682 ZTE,"Remaining issues on multi-carrier PRACH in NB-IoT",3GPP TSG—RAN WG2 Meeting#96,Reno, USA, Nov. 14-18, 2016,total 6 pages.
3GPP TS 36.213 V14.2.0 (Mar. 2017),3rd Generation Partnership Project;Technical Specification Group Radio Access Network;Evolved Universal Terrestrial Radio Access (E-UTRA);Physical layer procedures(Release 14),total 454 pages.
XP051273121 R1-1707923 Samsung,"Power control for extended coverage UE",3GPP TSG RAN WG1 Meeting #89, Hangzhou, P.R. China May 15-19, 2017,total 2 pages.
3GPP TS 36.331 V14.2.2 (Apr. 2017),3rd Generation Partnership Project;Technical Specification Group Radio Access Network;Evolved Universal Terrestrial Radio Access (E-UTRA); Radio Resource Control (RRC);Protocol specification (Release 14).
XP051272124 R1-1706893 Ericsson,"NB-IoT small cell support",3GPP TSG RAN#89, May 15-19, 2017, Hangzhou, China,total 5 pages.
3GPP TS 36.321 V14.2.1 (Mar. 2017),3rd Generation Partnership Project;Technical Specification Group Radio Access Network;Evolved Universal Terrestrial Radio Access (E-UTRA);Medium Access Control (MAC) protocol specification (Release 14),total 102 pages.
Sony, Considerations on PRACH resources for NB-IoT [online], 3GPP TSG RAN WG1 adhoc_LTE_NB-IoT_1601 R1-160179,Jan. 2016,total 3 pages.
Lenovo, Random Access Procedure for NB-IoT [online], 3GPP TSG-RAN WG1#84 R1-161009, Feb. 2016,total 4 pages.
Ericsson, Configuration of preamble groups for CE levels and preamble groups A/B—Alt2 [online], 3GPP TSG RAN WG2 #97bis R2-1703297, total 10 pages.

* cited by examiner

INDICATION INFORMATION SENDING METHOD, INDICATION INFORMATION RECEIVING METHOD, DEVICE, AND SYSTEM

CROSS-REFERENCE TO RELATED APPLICATIONS

This application is a continuation of International Application No. PCT/CN2018/086588, filed on May 11, 2018, which claims priority to Chinese Patent Application No. 201710349785.7, filed on May 17, 2017. The disclosures of the aforementioned applications are hereby incorporated by reference in their entireties.

TECHNICAL FIELD

This application relates to the field of wireless communications technologies, and in particular, to an indication information sending method, an indication information receiving method, a device, and a system.

BACKGROUND

Currently, in a Narrowband Internet of Things (NB-IoT) system, open-loop power control is used in uplink. Specifically, for a signal on a narrowband physical random access channel (NPRACH) in the NB-IoT system, when a coverage level of the signal is 0, a terminal device enables open-loop power control, and determines a transmit power of the signal on the NPRACH based on some power control parameters, such as a preamble (preamble) initial power and a downlink path loss. When failing to send the signal on the NPRACH based on the determined transmit power, the terminal device performs power ramping, and re-sends the signal. When the coverage level of the signal is 1 or 2, the signal is sent directly on the NPRACH based on a maximum transmit power of the terminal device, and the maximum transmit power is configured by a base station. For a signal on a narrowband physical uplink shared channel (NPUSCH) in the NB-IoT system, when a quantity of times of repeatedly sending the signal is less than or equal to 2, the terminal device enables open-loop power control, and determines a transmit power of the signal on the NPUSCH based on some power control parameters, such as a downlink path loss and a target received power. When the quantity of times of repeatedly sending the signal is greater than 2, the terminal device sends the signal on the NPUSCH directly based on the maximum transmit power of the terminal device.

In the prior art, a signal transmit power determining manner of the terminal device is fixed. In the signal transmit power determining manner, when a communications network has relatively light load or when there are a relatively small quantity of terminal devices in a communication status in a communications network, retransmission times of the terminal device can be reduced while quality of a transmitted signal is ensured. However, in the prior art, in the signal transmit power determining manner of the terminal device, because terminal devices send signals directly by using maximum transmit powers in most cases, interference between the signals of the terminal devices may be easily aggravated in a communications network with interference limitation or a communications network with relatively heavy load.

Therefore, in the prior art, a method for determining a transmit power in a preconfigured signal transmit power determining manner has relatively large limitations.

SUMMARY

Embodiments of this application provide an indication information sending method, an indication information receiving method, a device, and a system, so that a terminal device flexibly determines a transmit power of a signal.

According to a first aspect, an embodiment of this application provides an indication information sending method, including:

generating, by a network device, first indication information, and sending the first indication information to a terminal device, where the first indication information is used to indicate a power control manner of a first channel, the power control manner of the first channel is one power control manner in a power control manner set, and the power control manner set includes at least one of the following power control manners:

a transmit power of a signal on the first channel is determined by the terminal device based on a first parameter;

a transmit power of a signal that meets a first transmission format and that is on the first channel is determined by the terminal device based on a second parameter, a transmit power of a signal that does not meet the first transmission format and that is on the first channel is determined by the terminal device, and the transmit power of the signal that does not meet the first transmission format and that is on the first channel is a maximum transmit power of the terminal device; and a transmit power of a signal on the first channel is determined by the terminal device according to a rule predefined on the terminal device.

Because the network device can send, to the terminal device, the first indication information used to indicate the power control manner of the first channel, compared with a prior-art preconfigured manner in which the terminal device determines a transmit power of a signal, the terminal device determines a transmit power of a signal in a more flexible manner, and interference between signals sent by terminal devices is reduced while a system capacity is improved.

Based on the first aspect, in a possible design, the network device receives a signal sent by the terminal device based on the power control manner that is of the first channel and that is indicated by the first indication information.

Because the terminal device sends the signal based on the power control manner indicated by the first indication information, a possibility that the network device receives the signal sent by the terminal device is increased.

For example, the network device may generate the first indication information with reference to a network feature such as a load status of a network, so that a more appropriate power control manner can be selected for the terminal device. Therefore, when transmitting the signal based on the power control manner indicated by the first indication information, the terminal device can better adapt to a current network environment, so that the possibility that the network device receives the signal sent by the terminal device is increased.

Based on the first aspect, in a possible design, the first channel is a physical uplink shared channel, or the first channel is a physical uplink control channel, or the first channel is a physical random access channel, or the first channel is another uplink transmission channel other than a physical uplink shared channel, a physical uplink control channel, and a physical random access channel.

Based on the first aspect, in a possible design, the first parameter includes at least one of the following:

a reference signal received power (RSRP), a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

It should be understood that transmission bandwidth is transmission bandwidth of the signal on the first channel, and a target received power is a target received power of the signal on the first channel.

Based on the first aspect, in a possible design, the second parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

It should be noted that the first parameter and the second parameter may be the same or different. For example, the first parameter is the RSRP, the path loss, and the maximum transmit power of the terminal device, and the second parameter is the transmission bandwidth, the maximum transmit power of the terminal device, and the target received power. Alternatively, both the first parameter and the second parameter are the transmission bandwidth and the maximum transmit power of the terminal device.

Based on the first aspect, in a possible design, the signal that meets the first transmission format and that is on the first channel may be specifically implemented in the following manner:

a signal whose repeated sending times meet a first condition and that is on the first channel;

a signal whose modulation and coding scheme (MCS) level meets a second condition and that is on the first channel;

a signal whose transport block size meets a third condition and that is on the first channel; or a signal whose coverage level meets a fourth condition and that is on the first channel.

The first condition, the second condition, the third condition, and the fourth condition may be preconfigured on the network device, or may be configured by the network device.

When the first condition, the second condition, the third condition, and the fourth condition are configured by the network device, the terminal device can better adapt to a current network environment and the like when sending the signal based on the power control manner indicated by the first indication information.

Based on the first aspect, in a possible design, the first indication information is carried in a system message; or the first indication information is carried in other higher layer signaling other than a system message.

According to a second aspect, an indication information receiving method is provided, including:

receiving, by a terminal device, first indication information sent by a network device, and determining a power control manner of a first channel based on the first indication information, where the first indication information is used to indicate the power control manner of the first channel, the power control manner of the first channel is one power control manner in a power control manner set, and the power control manner set includes at least one of the following power control manners:

a transmit power of a signal on the first channel is determined by the terminal device based on a first parameter;

a transmit power of a signal that meets a first transmission format and that is on the first channel is determined by the terminal device based on a second parameter, a transmit power of a signal that does not meet the first transmission format and that is on the first channel is determined by the terminal device, and the transmit power of the signal that does not meet the first transmission format and that is on the first channel is a maximum transmit power of the terminal device; and a transmit power of a signal on the first channel is determined by the terminal device according to a rule predefined on the terminal device.

Because the terminal device can determine the power control manner of the first channel based on the power control manner indicated by the first indication information, compared with the prior art, the power control manner determined by the terminal device is more flexible. In addition, because the first indication information is sent by the network device to the terminal device, interference between signals sent by terminal devices is reduced while a system capacity is improved.

Based on the second aspect, in a possible design, the terminal device determines the transmit power of the signal on the first channel based on the power control manner of the first channel, and sends a signal to the network device based on the transmit power of the signal on the first channel.

Because the terminal device sends, to the network device, the signal based on the power control manner that is of the first channel that is indicated by the first indication information, a possibility that the network device receives the signal sent by the terminal device is increased.

For example, the network device may generate the first indication information with reference to a network feature such as a load status of a network, so that a more appropriate power control manner can be selected for the terminal device. Therefore, when transmitting the signal based on the power control manner indicated by the first indication information, the terminal device can better adapt to a current network environment, so that the possibility that the network device receives the signal sent by the terminal device is increased.

Based on the second aspect, in a possible design, the first channel is a physical uplink shared channel, or the first channel is a physical uplink control channel, or the first channel is a physical random access channel, or the first channel is another uplink transmission channel other than a physical uplink shared channel, a physical uplink control channel, and a physical random access channel.

Based on the second aspect, in a possible design, the first parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

Based on the second aspect, in a possible design, the second parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

Based on the second aspect, in a possible design, the signal that meets the first transmission format and that is on the first channel may be specifically implemented in the following manner:

a signal whose repeated sending times meet a first condition and that is on the first channel;

a signal whose MCS level meets a second condition and that is on the first channel;

a signal whose transport block size meets a third condition and that is on the first channel; or a signal whose coverage level meets a fourth condition and that is on the first channel.

The first condition, the second condition, the third condition, and the fourth condition may be preconfigured on the network device, or may be configured by the network device.

When the first condition, the second condition, the third condition, and the fourth condition are configured by the network device, the terminal device can better adapt to a current network environment and the like when sending the signal based on the power control manner indicated by the first indication information.

Based on the second aspect, in a possible design, the first indication information is carried in a system message; or the first indication information is carried in other higher layer signaling other than a system message.

According to a third aspect, a network device is provided, including a processor and a transceiver. The processor is configured to generate first indication information, and the transceiver is configured to send the first indication information to a terminal device, where the first indication information is used to indicate a power control manner of a first channel, the power control manner of the first channel is one power control manner in a power control manner set, and the power control manner set includes at least one of the following power control manners:

a transmit power of a signal on the first channel is determined by the terminal device based on a first parameter;

a transmit power of a signal that meets a first transmission format and that is on the first channel is determined by the terminal device based on a second parameter, a transmit power of a signal that does not meet the first transmission format and that is on the first channel is determined by the terminal device, and the transmit power of the signal that does not meet the first transmission format and that is on the first channel is a maximum transmit power of the terminal device; and a transmit power of a signal on the first channel is determined by the terminal device according to a rule predefined on the terminal device.

Based on the third aspect, in a possible design, the transceiver is further configured to receive a signal sent by the terminal device based on the power control manner that is of the first channel and that is indicated by the first indication information.

Based on the third aspect, in a possible design, the first parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

Based on the third aspect, in a possible design, the second parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

According to a fourth aspect, an embodiment of this application provides an indication information sending apparatus, where the apparatus has a function of implementing behavior of the network device in the foregoing method embodiments. The function may be implemented by hardware, or may be implemented by hardware executing corresponding software. The hardware or software includes one or more modules corresponding to the foregoing function.

According to a fifth aspect, an embodiment of this application provides a computer storage medium, configured to store a computer software instruction for implementing the technical solution in the first aspect and any design provided in the first aspect, where the computer software instruction includes a program used to perform the first aspect and any design provided in the first aspect.

According to a sixth aspect, a terminal device is provided, including a transceiver and a processor. The transceiver is configured to receive first indication information sent by a network device, where the first indication information is used to indicate a power control manner of a first channel, the power control manner of the first channel is one power control manner in a power control manner set, and the power control manner set includes at least one of the following power control manners:

a transmit power of a signal on the first channel is determined by the terminal device based on a first parameter;

a transmit power of a signal that meets a first transmission format and that is on the first channel is determined by the terminal device based on a second parameter, a transmit power of a signal that does not meet the first transmission format and that is on the first channel is determined by the terminal device, and the transmit power of the signal that does not meet the first transmission format and that is on the first channel is a maximum transmit power of the terminal device; and a transmit power of a signal on the first channel is determined by the terminal device according to a rule predefined on the terminal device.

The processor is configured to determine the power control manner of the first channel based on the first indication information.

Based on the sixth aspect, in a possible design, the processor is further configured to determine the transmit power of the signal on the first channel based on the power control manner of the first channel; and the transceiver is further configured to send a signal to the network device based on the transmit power of the signal on the first channel.

Based on the sixth aspect, in a possible design, the first parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

Based on the sixth aspect, in a possible design, the second parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

According to a seventh aspect, an embodiment of this application provides an indication information receiving apparatus, where the apparatus has a function of implementing behavior of the terminal device in the foregoing method embodiments. The function may be implemented by hardware, or may be implemented by hardware executing corresponding software. The hardware or software includes one or more modules corresponding to the foregoing function. The module may be software and/or hardware.

According to an eighth aspect, an embodiment of this application provides a computer storage medium, configured to store a computer software instruction for implementing the technical solution in the second aspect and any design provided in the second aspect, where the computer software instruction includes a program used to perform the second aspect and any design provided in the second aspect.

According to a ninth aspect, an embodiment of this application provides a communications system, including the network device in the third aspect and any design provided in the third aspect, and the terminal device in the sixth aspect and any design provided in the sixth aspect.

DESCRIPTION OF EMBODIMENTS

The embodiments of this application are described in detail below with reference to the accompanying drawings.

Figure 1:
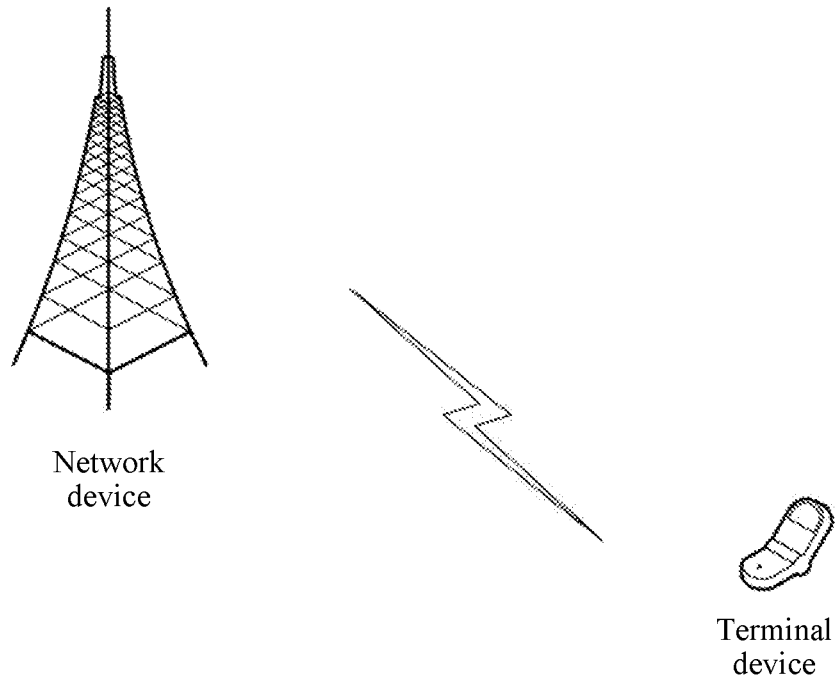
FIG. 1 is a diagram of a network architecture of a communications system according to an embodiment of this application.

As shown in FIG. 1, FIG. 1 is an architectural diagram of a communications system used in the embodiments of this application. The communications system includes a network device and a terminal device. FIG. 1 shows only one terminal device. However, the communications system used in the embodiments of this application may include one or more terminal devices. This is not limited herein. For example, the communications system used in the embodiments of this application may be a Long Term Evolution (LTE) system, or may be another wireless communications system such as a Global System for Mobile Communications (GSM), a Universal Mobile Telecommunications System (UMTS), a Code Division Multiple Access (CDMA) system, or a new network system. An NB-IoT system in the LTE system is used as an example below to describe the embodiments of this application in detail. When the communications system is the another communications system, a procedure is similar to that of the NB-IoT system. Details are not described herein. It should be understood that, in the NB-IoT system, a physical uplink shared channel is also referred to as an NPUSCH, a physical uplink control channel is also referred to as a narrowband physical uplink control channel (NPUCCH), a physical random access channel is also referred to as an NPRACH, and the like.

It should be understood that a network device in the embodiments of this application may be a base station, an access point, or a device in communication with a wireless terminal by using one or more sectors on an air interface in an access network. When the network device is a base station, the base station may be configured to mutually convert a received over-the-air frame and an Internet Protocol (IP) packet, and is used as a router between the wireless terminal and a remaining part of the access network, where the remaining part of the access network may include an IP network. The base station may also be configured to coordinate attribute management of the air interface. For example, the base station may be a base transceiver station (BTS) in the GSM or the CDMA system, may be a NodeB (NodeB) in Wideband Code Division Multiple Access (WCDMA), or may be an evolved NodeB (eNB) in the LTE system. This is not limited in the embodiments of this application.

It should be understood that a terminal device in the embodiments of this application may be a device configured to provide voice and/or data connectivity for a user, a handheld device with a wireless connection function, or another processing device connected to a wireless modem. The terminal device may alternatively be a wireless terminal. The wireless terminal may communicate with one or more core networks by using a radio access network (RAN). The wireless terminal may be a mobile terminal, such as a mobile phone (also referred to as a "cellular" phone) or a computer with a mobile terminal. For example, the computer with a mobile terminal may be a portable, pocket-sized, handheld, computer built-in, or in-vehicle mobile apparatus, which exchanges voice and/or data with the radio access network. For example, the wireless terminal may alternatively be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point (AP), a remote terminal, an access terminal, a user terminal, a user agent, a user device, user equipment, or the like. The embodiments of this application are not limited thereto.

In the embodiments of this application, because a network device can indicate a power control manner of a first channel to a terminal device by using first indication information, the network device can indicate the power control manner of the first channel to the terminal device based on a network feature such as a current load status or a current signal transmission status of the network device, so that flexibility of sending a signal by the terminal device to the network device is improved, and power control of the terminal device can better adapt to a current communications network.

It should be understood that the power control manner in the embodiments of this application may also be referred to as a power control standard, a power control mode, a power control method, power control behavior, power control performance, a power control parameter, or the like. This is not limited herein. The power control manner of the first channel is used to indicate a manner of determining a transmit power of a signal on the first channel.

For ease of description, in the embodiments of this application, descriptions are provided by using a base station as the network device. This is merely an example in the embodiments of this application, and this application includes but is not limited to the example.

Figure 2:
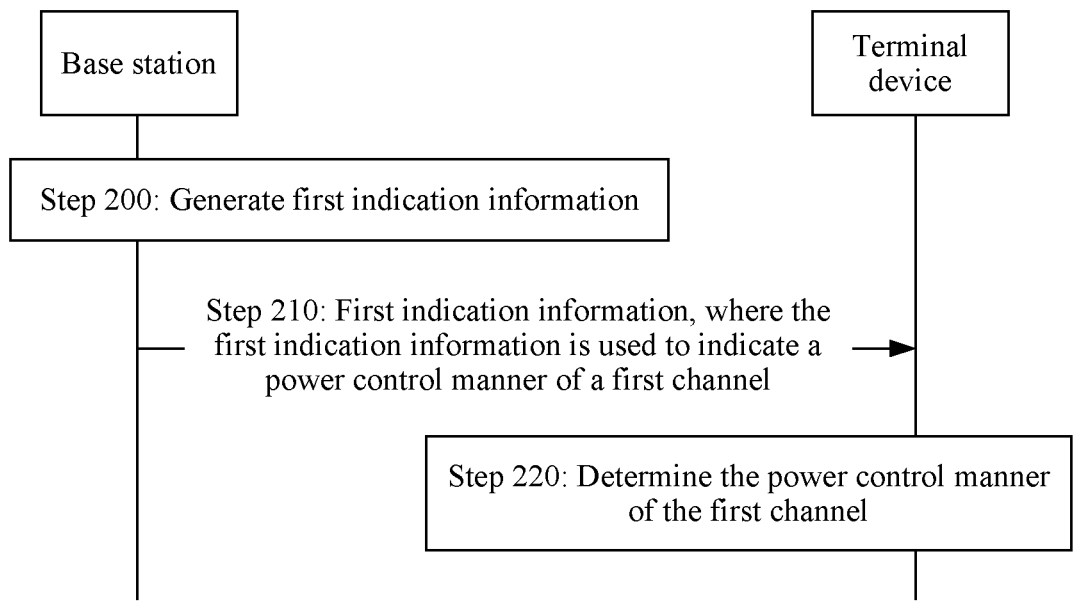
FIG. 2 is a schematic flowchart of an indication information sending and receiving method according to an embodiment of this application.

As shown in FIG. 2, an indication information sending and receiving method in an embodiment of this application includes the following steps:

Step 200: A base station generates first indication information, where the first indication information is used to indicate a power control manner of a first channel, the power control manner of the first channel is one power control manner in a power control manner set, and the power control manner set includes at least one of the following power control manners:

a transmit power of a signal on the first channel is determined by a terminal device based on a first parameter;

a transmit power of a signal that meets a first transmission format and that is on the first channel is determined by a terminal device based on a second parameter, a transmit power of a signal that does not meet the first transmission format and that is on the first channel is determined by the terminal device, and the transmit power of the signal that does not meet the first transmission format and that is on the first channel is a maximum transmit power of the terminal device; and a transmit power of a signal on the first channel is determined by a terminal device according to a rule predefined on the terminal device.

Step 210: The base station sends the first indication information to the terminal device.

Step 220: After receiving the first indication information sent by the base station, the terminal device determines the power control manner of the first channel based on the first indication information.

Specifically, the first channel in this embodiment of this application may be a physical uplink shared channel, a physical uplink control channel, or a physical random access channel; or the first channel is another uplink transmission channel other than a physical uplink shared channel, a physical uplink control channel, or a physical random access channel. This is not limited in this embodiment of this application.

For example, the first indication information in this embodiment of this application is a bit value, and different bit values are corresponding to different power control manners. For example, the power control manner set includes three power control manners. In a power control manner corresponding to a bit value 00, the transmit power of the signal on the first channel is determined by the terminal device based on the first parameter. In a power control manner corresponding to a bit value 01, the transmit power of the signal that meets the first transmission format and that is on the first channel is determined by the terminal device based on the second parameter, the transmit power of the signal that does not meet the first transmission format and that is on the first channel is determined by the terminal device, and the transmit power of the signal that does not meet the first transmission format and that is on the first channel is the maximum transmit power of the terminal device. In a power control manner corresponding to a bit value 11, the transmit power of the signal on the first channel is determined by the terminal device according to the rule predefined on the terminal device. In the power control manners that need to be indicated to the terminal device by the base station, when the transmit power of the signal on the first channel is determined by the terminal device based on the first parameter, the first indication information is the bit value 00. In addition, the first indication information may be a sequence or the like, and an implementation thereof is similar to that of a case in which the first indication information is a bit value. Details are not described herein.

In this embodiment of this application, when the power control manner set includes two power control manners, the base station may indicate one of the power control manners by sending the first indication information, or indicate the other power control manner by sending no information. For example, when there is information in an information field that carries the first indication information, for example, a bit value 1, one power control manner in the power control manner set is indicated; or when an information field that carries the first indication information is null, the other power control manner in the power control manner set is indicated.

Optionally, in this embodiment of this application, the first indication information may be carried in a system message, and then sent to the terminal device; or the first indication information is carried in other higher layer signaling other than a system message, and then sent to the terminal device. This is not limited in this embodiment of this application.

For example, in an NB-IoT system, the first indication information may be carried in system information. Specifically, the first indication information may be carried in an RACH-ConfigCommon information field of a SIB2-NB. In addition, the first indication information may alternatively be carried on a master information block (MIB) or any system information block (SIB).

For example, the first indication information may alternatively be carried in Radio Resource Control (RRC) signaling. During specific implementation, the NB-IoT system is used as an example, and the first indication information may be carried in a Radio Resource Config Dedicated-NB information field; or the first indication information may be carried in a Physical Config Dedicated-NB information field; or the first indication information may be carried in an uplink Power Control Dedicated information field.

Power control manners that may be included in the power control manner set are separately specifically described below.

A first power control manner is as follows: The transmit power of the signal on the first channel is determined by the terminal device based on the first parameter.

It should be noted that, in this power control manner, the terminal device always determines the transmit power of the signal on the first channel in an open-loop power control manner based on the first parameter. For example, the terminal device determines a transmit power of a signal on an NPUSCH based on a path loss, determines a transmit power of a signal on an NPRACH based on a preamble initial power and a quantity of times of repeatedly sending a preamble, or the like.

In this power control manner, the terminal device determines the transmit power of the signal on the first channel based on an actual requirement. Therefore, when there is relatively heavy load or interference limitation in a communications network, compared with a manner of sending a signal based on the maximum transmit power of the terminal device, a system capacity can be improved to some extent, and interference between signals of terminal devices can be reduced.

Specifically, in this embodiment of this application, the first parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

Any one of the foregoing may be sent by the base station to the terminal device by using signaling, may be measured by the terminal device, may be obtained by the terminal device through calculation, or may be predefined on the terminal device. It should be noted that, for example, the first channel is a physical random access channel, and transmission bandwidth, maximum transmit powers of the terminal device, preamble received target powers, preamble initial received target powers, offset powers, power ramping steps, path loss estimate ratio coefficients, or quantities of repetition times that are used by the terminal device to determine transmit powers of signals with different coverage levels on the physical random access channel may be the same or may be different. It should be further noted that the initial transmit power is an initial transmit power of the signal on the first channel.

The NB-IoT system is used as an example. For example, the first channel is an NPUSCH, and when the first parameter includes the maximum transmit power of the terminal device, the transmission bandwidth parameter, the path loss, the initial transmit power, and the path loss estimate ratio coefficient, a transmit power of a signal on the NPUSCH meets the following formula:

$$P_{NPUSCH,c}(i) = \min\left\{ \begin{array}{l} P_{CMAX,c}(i), \\ 10\log_{10}(M_{NPUSCH,c}(i)) + P_{O\_NPUSCH,c}(j) + \alpha_c(j) \cdot PL_c \end{array} \right\}(dBm),$$

where $P_{NPUSCH,c}(i)$ represents the transmit power of the signal on the physical uplink shared channel in a timeslot i, $P_{CMAX,c}(i)$ represents a maximum transmit power used by the terminal device to send, in a subframe i in a cell c, the signal on the physical uplink shared channel, $M_{NPUSCH,c}(i)$ represents the transmission bandwidth parameter, and is specifically a bandwidth coefficient of the signal on the physical uplink shared channel in the timeslot i, $P_{O\_NPUSCH,c}(j)$ represents an initial transmit power of a dynamically scheduled NPUSCH when j=1, or represents an initial transmit power of a message 3 in a random access process when j=2, $\alpha_c(j)$ represents a path loss estimate factor, and specifically represents a path loss estimate ratio coefficient of the dynamically scheduled NPUSCH when j=1, or represents a path loss estimate ratio coefficient of the message 3 in the random access process when j=2, $PL_c$ represents a downlink path loss that is of the cell c and that is measured by the terminal device, and dBm is a power unit.

The NB-IoT system is used as an example. For example, the first channel is an NPRACH, and when the first parameter includes the path loss, the maximum transmit power of the terminal device, the preamble received target power, the preamble initial received target power, the offset power, the quantity of preamble attempts, the power ramping step, and the quantity of times of repeatedly sending a signal, a transmit power of a signal on the NPRACH meets the following formula:

$$P_{NPRACH} = \min\left\{ \begin{array}{l} P_{CMAX,c}(i), \\ P_{PRT} + PL_c \end{array} \right\}(dBm);$$

specifically, $P_{PRT} = P_{PIRT} + P_{DP} + (N_{p1}-1) \times P_s - 10\log_{10} N_{p2}$, where $P_{NPRACH}$ represents the transmit power of the signal on the NPRACH, $P_{CMAX,c}(i)$ represents the maximum transmit power of the terminal device, and specifically represents a maximum transmit power used by the terminal device to send, in a subframe i in a cell c, the signal on the physical random access channel, $P_{PRT}$ represents the preamble received target power, $PL_c$ represents a downlink path loss that is of the cell c and that is measured by the terminal device, $P_{PIRT}$ represents the preamble initial received target power, $P_{DP}$ represents the offset power, and is specifically a power offset of a preamble, $N_{p1}$ represents the quantity of preamble attempts, and is specifically a quantity of times of attempting to send the preamble, for example, when the terminal device attempts to perform sending for a fifth time, a value of $N_{p1}$ is 5, $P_s$ represents the power ramping step, and specifically represents a power value increased during re-access by the terminal device after a random access failure, and $N_{p2}$ represents a current quantity of times of repeatedly sending the preamble.

The foregoing power control manner is used only as an example for description. It should be understood that, in this embodiment of this application, the first parameter may include at least one of the RSRP, the path loss, the transmission bandwidth parameter, the maximum transmit power of the terminal device, the preamble received target power, the preamble initial received target power, the initial transmit power, the offset power, the quantity of preamble attempts, the power ramping step, the path loss estimate ratio coefficient, the quantity of repetition times, and the power indication parameter. The transmission bandwidth parameter is used to represent transmission bandwidth of a signal or a value corresponding to the transmission bandwidth, and the power indication parameter represents a parameter or a parameter set, other than the RSRP, the path loss, the transmission bandwidth parameter, the maximum transmit power of the terminal device, the preamble received target power, the preamble initial received target power, the initial transmit power, the offset power, the quantity of preamble attempts, the power ramping step, the path loss estimate ratio coefficient, and the quantity of repetition times, that is used in a process of determining the transmit power of the signal on the first channel.

A second power control manner is as follows: The transmit power of the signal that meets the first transmission format and that is on the first channel is determined by the terminal device based on the second parameter, the transmit power of the signal that does not meet the first transmission format and that is on the first channel is determined by the terminal device, and the transmit power of the signal that does not meet the first transmission format and that is on the first channel is the maximum transmit power of the terminal device.

In this power control manner, the first transmission format may be configured by the base station, or may be preset.

Specifically, the signal that meets the first transmission format and that is on the first channel may be:

a signal whose repeated sending times meet a first condition and that is on the first channel, a signal whose MCS level meets a second condition and that is on the first channel, a signal whose transport block size meets a third condition and that is on the first channel, or a signal whose coverage level meets a fourth condition and that is on the first channel.

In this embodiment of this application, the first condition, the second condition, the third condition, or the fourth condition may be preset on the base station, or may be configured by the base station. When the first condition, the second condition, the third condition, or the fourth condition is configured by the base station, the base station may perform corresponding configuration based on a current load status and the like of a network system.

For example, the signal whose repeated sending times meet the first condition and that is on the first channel may be a signal whose repeated sending times are less than a first threshold and that is on the first channel, a signal whose repeated sending times are not greater than a first threshold and that is on the first channel, a signal whose repeated sending times are greater than a first threshold and that is on the first channel, or a signal whose repeated sending times are not less than a first threshold and that is on the first channel. The first threshold may be preset. For example, the first threshold may be set to 2. The first threshold may alternatively be set by the base station. For example, when the base station has relatively heavy load, if the signal whose repeated sending times meet the first condition and that is on the first channel is the signal whose repeated sending times are less than the first threshold and that is on the first channel, or the signal whose repeated sending times are not greater than the first threshold and that is on the first channel, the first threshold may be set to a larger value, to improve the system capacity. For example, the first threshold may be configured as 16 or the like.

The signal whose repeated sending times meet the first condition and that is on the first channel may alternatively be a signal whose repeated sending times fall within a particular range and that is on the first channel. The particular range may be determined by the base station, or may be preset. The particular range may be a continuous range, for example, positive integers between N1 and N2, or may be a discontinuous range, for example, positive integers between N1 and N2, and positive integers between N3 and N4. N1, N2, N3, and N4 are different positive integers.

For example, the signal whose MCS level meets the second condition and that is on the first channel may be a signal whose MCS level is lower than a first level and that is on the first channel, a signal whose MCS level is not higher than a first level and that is on the first channel, a signal whose MCS level is higher than a first level and that is on the first channel, or a signal whose MCS level is not lower than a first level and that is on the first channel. The first level may be preset. For example, the first level may be set to 1. The first level may alternatively be set by the base station. For example, when the base station has relatively light load, if the signal whose MCS level meets the second condition and that is on the first channel is the signal whose MCS level is lower than the first level and that is on the first channel, or the signal whose MCS level is not higher than the first level and that is on the first channel, to provide a better service for the terminal device, the base station may set the first level to a smaller value, for example, the base station sets the first level to 1. Alternatively, when the base station has relatively heavy load, if the signal whose MCS level meets the second condition and that is on the first channel is the signal whose MCS level is lower than the first level and that is on the first channel, or the signal whose MCS level is not higher than the first level and that is on the first channel, to improve the system capacity, the base station may set the first level to a larger value, for example, the base station sets the first level to 4.

For example, the NB-IoT system is used as an example, and N MCS levels are included, such as an MCS level 0, an MCS level 1, . . . , an MCS level (N−1). The MCS level that is of the signal and that meets the second condition is a subset of the N MCS levels. For example, the signal whose MCS level meets the second condition and that is on the first channel may be a signal whose MCS level falls within a particular MCS level range and that is on the first channel. For example, the particular MCS level range includes an MCS level 3, an MCS level 4, and an MCS level 9. Specifically, the particular MCS level range may be configured by the base station, or may be preset. This is not limited herein.

For example, the signal whose transport block size meets the third condition and that is on the first channel may be a signal whose transport block size is less than a second threshold and that is on the first channel, a signal whose transport block size is not greater than a second threshold and that is on the first channel, a signal whose transport block size is greater than a second threshold and that is on the first channel, or a signal whose transport block size is not less than a second threshold and that is on the first channel. The second threshold may be preconfigured, and may be set by the base station. For example, when the second threshold is set by the base station, the base station may perform corresponding setting based on a load status of the base station, to reduce interference between signals sent by terminal devices in the network system, so that signal transmission in the network is dynamically balanced.

The signal whose transport block size meets the third condition and that is on the first channel may alternatively be a signal whose transport block size falls within a particular range and that is on the first channel. The particular range may be configured by the base station, or may be preset. This is not limited herein.

For example, the signal whose coverage level meets the fourth condition and that is on the first channel may be a signal whose coverage level is less than a second level and that is on the first channel, a signal whose coverage level is not greater than a second level and that is on the first channel, a signal whose coverage level is greater than a second level and that is on the first channel, or a signal whose coverage level is not less than a second level and that is on the first channel. The second level is a particular coverage level, and may be preconfigured, or may be set by the base station. For example, an NPRACH in the NB-IoT system is used as an example, and N coverage levels are included, such as a coverage level 0, a coverage level 1, . . . , a coverage level (N−1). The second level may be the coverage level 0, the coverage level 1, . . . , or the coverage level (N−1). When the second level is set by the base station, the base station may perform corresponding setting based on a load status of the base station, to reduce interference between signals sent by the terminal devices in the network system, so that signal transmission in the network is dynamically balanced.

For example, the signal whose coverage level meets the fourth condition and that is on the first channel may alternatively be a signal whose coverage level falls within a particular coverage level range and that is on the first channel. The particular coverage level range may be configured by the base station, or may be preset. This is not limited herein.

Specifically, in this embodiment of this application, the second parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

Any one of the foregoing may be sent by the base station to the terminal device by using signaling, may be measured by the terminal device, may be obtained by the terminal device through calculation, or may be predefined on the terminal device. It should be noted that, for example, the first channel is a physical random access channel, and transmission bandwidth, maximum transmit powers of the terminal device, preamble received target powers, preamble initial received target powers, offset powers, power ramping steps, path loss estimate ratio coefficients, or quantities of repetition times that are used by the terminal device to determine transmit powers of signals with different coverage levels on the physical random access channel may be the same or may be different. It should be further noted that the initial transmit power is an initial transmit power of the signal on the first channel.

The NB-IoT system is used as an example. For example, the first channel is an NPUSCH, and when the second parameter includes the maximum transmit power of the terminal device, the transmission bandwidth parameter, the path loss, the initial transmit power, and the path loss estimate ratio coefficient, a transmit power of a signal that meets the first transmission format and that is on the NPUSCH meets the following formula:

$$P_{NPUSCH,c}(i) = \min\left\{ \begin{array}{l} P_{CMAX,c}(i), \\ 10\log_{10}(M_{NPUSCH,c}(i)) + P_{O\_NPUSCH,c}(j) + \alpha_c(j) \cdot PL_c \end{array} \right\}(dBm),$$

where $P_{NPUSCH,c}(i)$ represents the transmit power of the signal on the physical uplink shared channel in a timeslot i, $P_{CMAX,c}(i)$ represents a maximum transmit power used by the terminal device to send, in the timeslot i, the signal on the physical uplink shared channel, $M_{NPUSCH,c}(i)$ represents the transmission bandwidth parameter, and is specifically a bandwidth coefficient of the signal on the physical uplink shared channel in the timeslot i, $P_{O\_NPUSCH,c}(j)$ represents an initial transmit power of a dynamically scheduled NPUSCH when j=1, or represents an initial transmit power of a message 3 in a random access process when j=2, $\alpha_c(j)$ represents a path loss estimate factor, and specifically represents a path loss estimate ratio coefficient of the dynamically scheduled NPUSCH when j=1, or represents a path loss estimate ratio coefficient of the message 3 in the random access process when j=2, $PL_c$ represents a downlink path loss determined by the terminal device, and dBm is a power unit.

A transmit power of a signal that does not meet the first transmission format and that is on the NPUSCH is the maximum transmit power of the terminal device.

The NB-IoT system is used as an example. For example, the first channel is an NPRACH, and when the second parameter includes the path loss, the maximum transmit power of the terminal device, the preamble received target power, the preamble initial received target power, the offset power, the quantity of preamble attempts, the power ramping step, and the quantity of times of repeatedly sending a signal, a transmit power of a signal that meets the first transmission format and that is on the NPRACH meets the following formula:

$$P_{NPRACH} = \min\left\{ \begin{array}{l} P_{CMAX,c}(i), \\ P_{PRT} + PL_c \end{array} \right\}(dBm);$$

specifically, $P_{PRT} = P_{PIRT} + P_{DP} + (N_{p1}-1) \times P_s - 10\log_{10} N_{p2}$, where $P_{NPRACH}$ represents the transmit power of the signal that meets the first transmission format and that is on the NPRACH, $P_{CMAX,c}(i)$ represents the maximum transmit power of the terminal device, and specifically represents a maximum transmit power used by the terminal device to send, in a subframe i in a cell c, the signal on the physical random access channel, $P_{PRT}$ represents the preamble received target power, $PL_c$ represents a downlink path loss that is of the cell c and that is measured by the terminal device, $P_{PIRT}$ represents the preamble initial received target power, $P_{DP}$ represents the offset power, and is specifically a power offset of a preamble, $N_{p1}$ represents the quantity of preamble attempts, and is specifically a quantity of times of attempting to send the preamble, for example, when the terminal device attempts to perform sending for a fifth time, a value of $N_{p1}$ is 5, $P_s$ represents the power ramping step, and specifically represents a power value increased during re-access by the terminal device after a random access failure, and $N_{p2}$ represents a current quantity of times of repeatedly sending the preamble.

A transmit power of a signal that does not meet the first transmission format and that is on the NPRACH is the maximum transmit power of the terminal device.

The foregoing power control manner is used only as an example for description. It should be understood that, in this embodiment of this application, the second parameter may include at least one of the RSRP, the path loss, the transmission bandwidth parameter, the maximum transmit power of the terminal device, the preamble received target power, the preamble initial received target power, the initial transmit power, the offset power, the quantity of preamble attempts, the power ramping step, the path loss estimate ratio coefficient, the quantity of repetition times, and the power indication parameter. The transmission bandwidth parameter is used to represent transmission bandwidth of a signal or a value corresponding to the transmission bandwidth, and the power indication parameter represents a parameter or a parameter set, other than the RSRP, the path loss, the transmission bandwidth parameter, the maximum transmit power of the terminal device, the preamble received target power, the preamble initial received target power, the offset power, the quantity of preamble attempts, the power ramping step, the path loss estimate ratio coefficient, and the quantity of repetition times, that is used in a process of determining the transmit power of the signal on the first channel. It should be further noted that the initial transmit power is an initial transmit power of the signal on the first channel.

A third power control manner is as follows: The transmit power of the signal on the first channel is determined by the terminal device according to the rule predefined on the terminal device. The rule predefined on the terminal device may be a method, a function, a mapping relationship, or the like that can be used by any terminal device to determine a final transmit power of the signal. The terminal device determines the transmit power of the signal on the first channel, without being affected or controlled by the base station, so that signal transmission efficiency of the terminal device can be ensured to a greatest extent. For example, the terminal device always determines that the transmit power of the signal on the first channel is the maximum transmit power of the terminal device, so that to-be-transmitted data of the terminal device can be sent to the base station with a low delay and high reliability.

Figure 3:
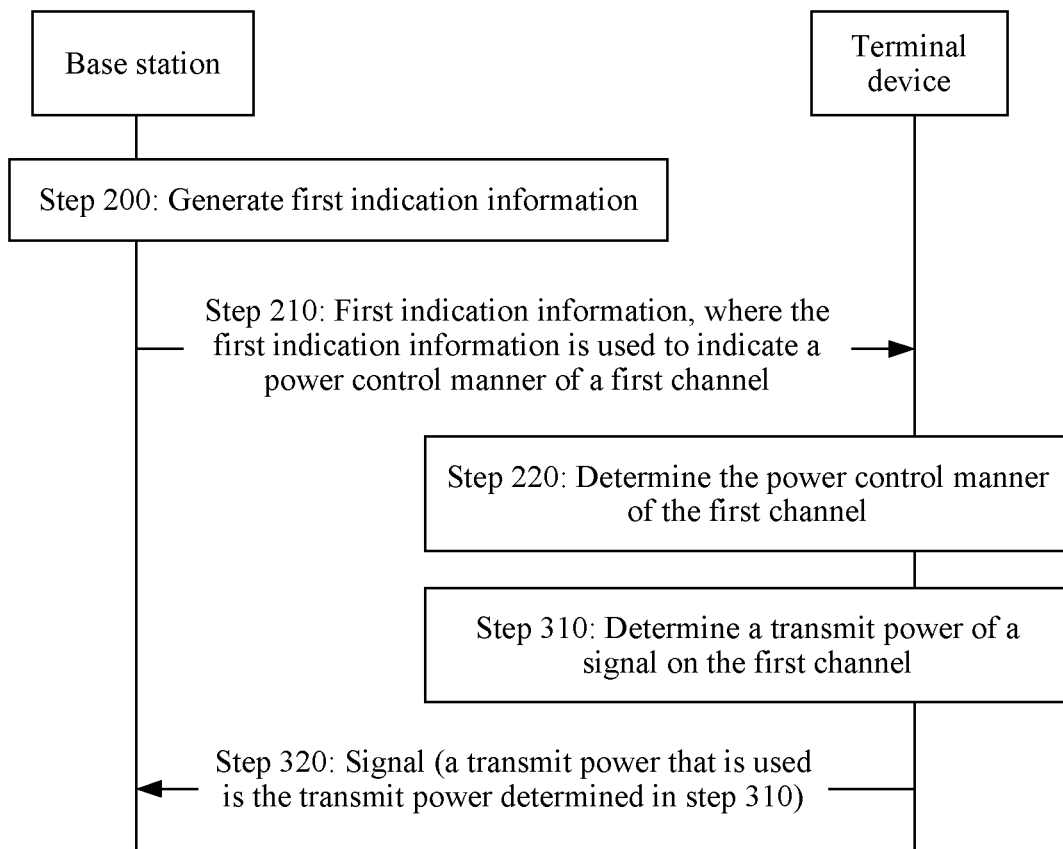
FIG. 3 is a schematic flowchart of a signal transmission method according to an embodiment of this application.

FIG. 3 shows a signal transmission method based on the power control manner in the embodiments of this application. In addition to step 200 to step 220 in the indication information sending and receiving method shown in FIG. 2, the method further includes the following steps:

Step 310: The terminal device determines the transmit power of the signal on the first channel based on the power control manner of the first channel.

Step 320: The terminal device sends a signal to the base station based on the transmit power of the signal on the first channel, and then the base station receives the signal sent by the terminal device.

Because the terminal device can determine the transmit power of the signal on the first channel by using the first indication information sent by the base station, interference between the signal sent by the terminal device and a signal sent by another terminal device is relatively small, so that a possibility that the terminal device successfully sends a signal to the base station is increased.

Based on a same concept, an embodiment of this application further provides a network device. The network device is configured to perform an action or a function of the network device in the foregoing method embodiments.

Based on a same concept, an embodiment of this application further provides a terminal device. The terminal device is configured to perform an action or a function of the terminal device in the foregoing method embodiments.

An embodiment of this application further provides a communications system, including the network device and the terminal device in the foregoing embodiments.

For brevity, for content of an apparatus part, specifically refer to the method embodiments. Details are not repeatedly described.

Figure 4A:
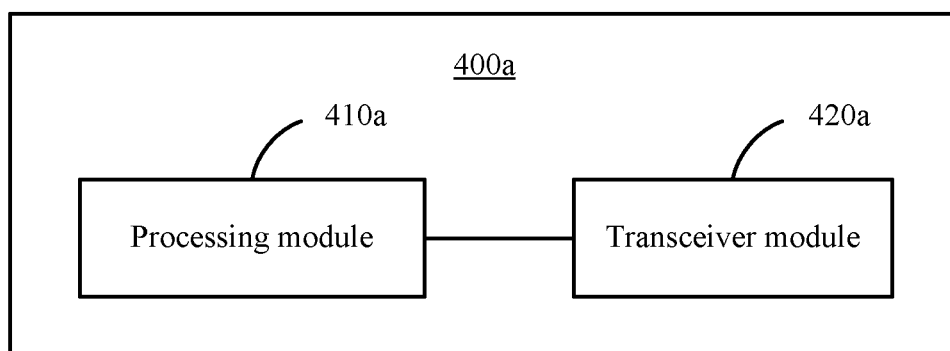
FIG. 4a and FIG. 4b are schematic structural diagrams of a network device according to an embodiment of this application.

FIG. 4a shows a network device 400a according to an embodiment of this application. The network device 400a includes a processing module 410a and a transceiver module 420a. The processing module 410a is configured to generate first indication information. The first indication information is used to indicate a power control manner of a first channel, the power control manner of the first channel is one power control manner in a power control manner set, and the power control manner set includes at least one of the following power control manners:

a transmit power of a signal on the first channel is determined by a terminal device based on a first parameter;

a transmit power of a signal that meets a first transmission format and that is on the first channel is determined by a terminal device based on a second parameter, a transmit power of a signal that does not meet the first transmission format and that is on the first channel is determined by the terminal device, and the transmit power of the signal that does not meet the first transmission format and that is on the first channel is a maximum transmit power of the terminal device; and a transmit power of a signal on the first channel is determined by a terminal device according to a rule predefined on the terminal device.

The transceiver module 420a is configured to send the first indication information to the terminal device.

In a possible implementation, the transceiver module 420a is configured to receive a signal sent by the terminal device based on the power control manner that is of the first channel and that is indicated by the first indication information.

In a possible implementation, the first parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

In a possible implementation, the second parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

It should be noted that, in this embodiment of this application, the processing module 410a may be implemented by a processor, and the transceiver module 420a may be implemented by a transceiver. Specifically, the transceiver includes a receiver and a transmitter, the receiver is configured to receive a signal or data, and the transmitter is configured to send a signal or data.

Figure 4B:
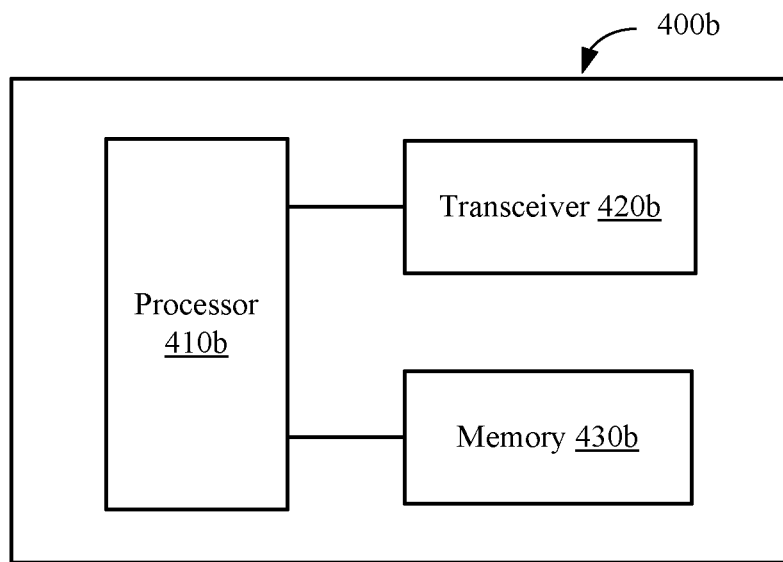

As shown in FIG. 4b, FIG. 4b is a schematic structural diagram of hardware of a network device 400b according to an embodiment of this application. The network device 400b may include a processor 410b, a transceiver 420b, and a memory 430b. The memory 430b may be configured to store a program/code pre-installed when the network device 400b is delivered from a factory, may store code executed by the processor 410b, or the like.

The processor 410b may be a general-purpose central processing unit (CPU), a microprocessor, an application-specific integrated circuit (ASIC), or one or more integrated circuits, and is configured to perform a related operation, to implement technical solutions provided in the embodiments of this application.

It should be noted that although only the processor 410b, the transceiver 420b, and the memory 430b are shown for the network device 400b shown in FIG. 4b, in a specific implementation process, a person skilled in the art should understand that the network device 400b further includes another component necessary for normal running. In addition, a person skilled in the art should understand that, based on a specific requirement, the network device 400b may further include a hardware component for implementing another additional function. In addition, a person skilled in the art should understand that the network device 400b may include only components or modules necessary for implementing this embodiment of this application, but does not need to include all the components shown in FIG. 4b.

A person of ordinary skill in the art may understand that all or some procedures for implementing the methods in the foregoing embodiments may be implemented by a computer program instructing related hardware. The foregoing program may be stored in a computer readable storage medium, and when the program runs, the procedures of the foregoing method embodiments may be implemented. The foregoing storage medium may be a magnetic disk, an optical disc, a read-only memory (ROM), a random access memory (RAM), or the like.

Figure 5A:
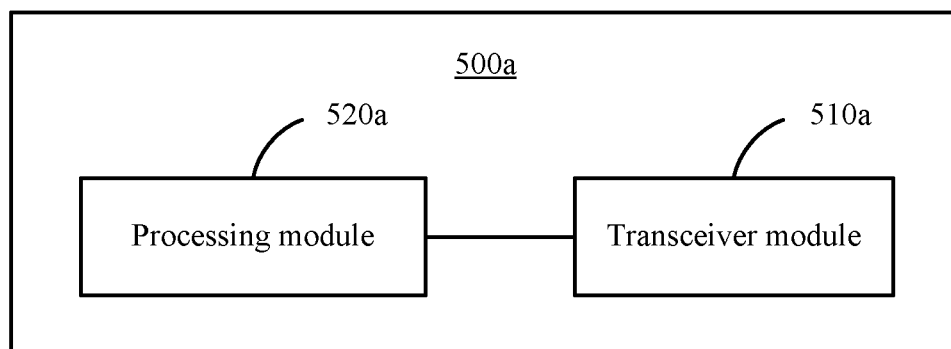
FIG. 5a and FIG. 5b are schematic structural diagrams of a terminal device according to an embodiment of this application.

FIG. 5a shows a terminal device 500a according to an embodiment of this application. The terminal device 500a includes a transceiver module 510a and a processing module 520a. The transceiver module 510a is configured to receive first indication information sent by a network device. The first indication information is used to indicate a power control manner of a first channel, the power control manner of the first channel is one power control manner in a power control manner set, and the power control manner set includes at least one of the following power control manners:

a transmit power of a signal on the first channel is determined by the terminal device based on a first parameter;

a transmit power of a signal that meets a first transmission format and that is on the first channel is determined by the terminal device based on a second parameter, a transmit power of a signal that does not meet the first transmission format and that is on the first channel is determined by the terminal device, and the transmit power of the signal that does not meet the first transmission format and that is on the first channel is a maximum transmit power of the terminal device; and a transmit power of a signal on the first channel is determined by the terminal device according to a rule predefined on the terminal device.

The processing module 520a is configured to determine the power control manner of the first channel based on the first indication information.

In a possible design, the processing module 520a is further configured to determine the transmit power of the signal on the first channel based on the power control manner of the first channel.

The transceiver module 510a is configured to send a signal to the network device based on the transmit power of the signal on the first channel.

In a possible design, the first parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

In a possible design, the second parameter includes at least one of the following:

an RSRP, a path loss, a transmission bandwidth parameter, the maximum transmit power of the terminal device, a preamble received target power, a preamble initial received target power, an initial transmit power, an offset power, a quantity of preamble attempts, a power ramping step, a path loss estimate ratio coefficient, a quantity of times of repeatedly sending a signal, and a power indication parameter.

It should be noted that, in this embodiment of this application, the processing module 520a may be implemented by a processor, and the transceiver module 510a may be implemented by a transceiver. Specifically, the transceiver includes a receiver and a transmitter, the receiver is configured to receive a signal or data, and the transmitter is configured to send a signal or data.

Figure 5B:
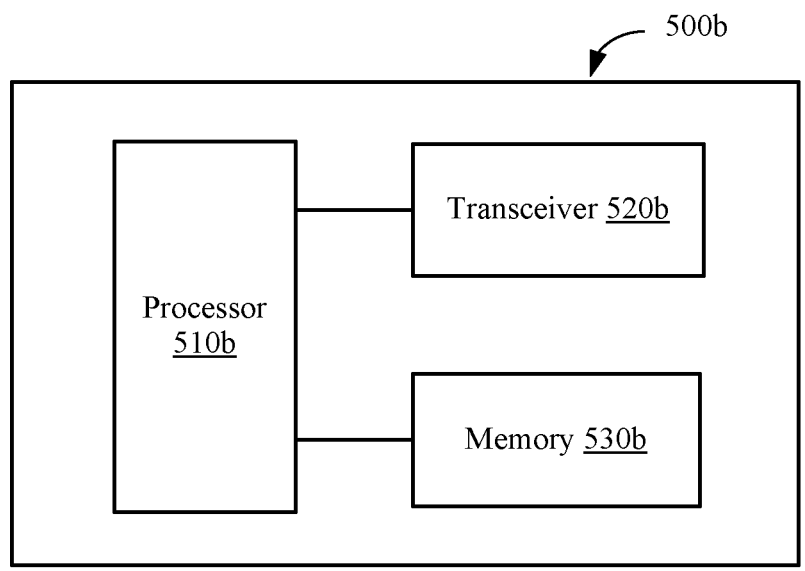

As shown in FIG. 5b, FIG. 5b is a schematic structural diagram of hardware of a terminal device 500b according to an embodiment of this application. The terminal device 500b may include a processor 510b, a transceiver 520b, and a memory 530b. The memory 530b may be configured to store a program/code pre-installed when the terminal device 500b is delivered from a factory, may store code executed by the processor 510b, or the like.

The processor 510b may be a general-purpose CPU, a microprocessor, an ASIC, or one or more integrated circuits, and is configured to perform a related operation, to implement technical solutions provided in the embodiments of this application.

It should be noted that although only the processor 510b, the transceiver 520b, and the memory 530b are shown for the terminal device 500b shown in FIG. 5b, in a specific implementation process, a person skilled in the art should understand that the terminal device 500b further includes another component necessary for normal running. In addition, a person skilled in the art should understand that, based on a specific requirement, the terminal device 500b may further include a hardware component for implementing another additional function. In addition, a person skilled in the art should understand that the terminal device 500b may include only components or modules necessary for implementing this embodiment of this application, but does not need to include all the components shown in FIG. 5b.

A person of ordinary skill in the art may understand that all or some procedures for implementing the methods in the foregoing embodiments may be implemented by a computer program instructing related hardware. The foregoing program may be stored in a computer readable storage medium, and when the program runs, the procedures of the foregoing method embodiments may be implemented. The storage medium may be a magnetic disk, an optical disk, a ROM, a RAM, or the like.

Figure 6:
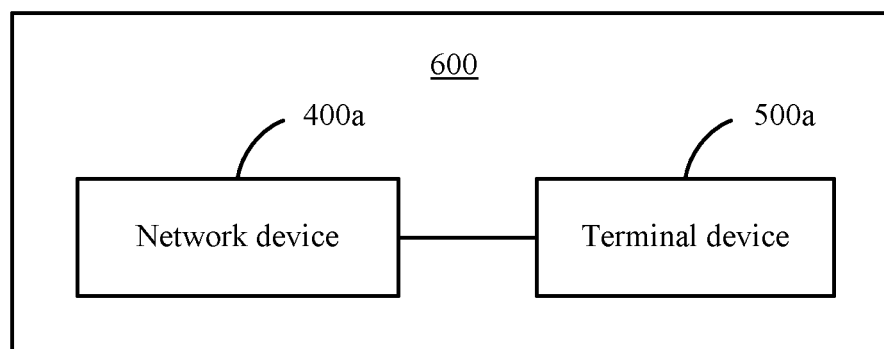
FIG. 6 is a schematic structural diagram of a communications system according to an embodiment of this application.

FIG. 6 shows a communications system 600 according to an embodiment of this application. The communications system 600 includes the network device shown in FIG. 4a and the terminal device shown in FIG. 5a.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product in the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to create a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
   determining, by a terminal device, whether first indication information is received;
   after determining that the first indication information is received, determining, by the terminal device, transmit power of a signal on a first channel based on a first parameter; or
   after determining that the first indication information is not received, determining, by the terminal device, transmit power of a signal on a first channel based on a second parameter, or determining, by the terminal device, transmit power of a signal on a first channel is the maximum transmit power of the terminal device; and
   sending, by the terminal device, the signal based on the transmit power of the signal on the first channel;
   wherein the first channel is a narrowband physical uplink shared channel (NPUSCH), and the determining, by the terminal device, transmit power of a signal on a first channel based on a second parameter, or determining, by the terminal device, wherein the transmit power of a signal on a first channel is the maximum transmit power of the terminal device comprises:
   determine, by the terminal device, the transmit power of the signal on the first channel based on the second parameter when repetition quantity of the signal on the NPUSCH is less than or equal to a first threshold; or
   determining, by the terminal device, the transmit power of the signal on the first channel is the maximum transmit power of the terminal device when quantity of repetition times of the signal on the NPUSCH is greater than a first threshold;
   and
   the first channel is an narrowband physical random access channel (NPRACH), and wherein the determining, by the terminal device, transmit power of a signal on a first channel based on a second parameter, or determining, by the terminal device, transmit power of a signal on a first channel is the maximum transmit power of the terminal device comprises:
   determining, by the terminal device, the transmit power of the signal on the first channel based on the second parameter when coverage level of the signal on the NPRACH is less than or equal to a second level; or
   determining, by the terminal device, the transmit power of the signal on the first channel is the maximum transmit power of the terminal device when coverage level of the signal on the NPRACH is greater than the second level.

2. The method according to claim 1, wherein the first threshold is 2.

3. The method according to claim 1, wherein the second level is coverage level 0.

4. The method according to claim 1, wherein the first channel is the NPUSCH, the first parameter comprises a maximum transmit power of the terminal device, a transmission bandwidth parameter, a path loss, an initial transmit power and a path loss estimate factor, the transmit power of a signal on the NPUSCH that is determined based on a first parameter in accordance with the following formula:

$$P_{NPUSCH,c}(i) = \min\left\{\begin{matrix}P_{CMAX,c}(i), \\ 10\log_{10}(M_{NPUSCH,c}(i)) + P_{O\_NPUSCH,c}(j) + \alpha_c(j) \cdot PL_c\end{matrix}\right\}(dBm),$$

wherein
$P_{NPUSCH,c}$ (i) represents the transmit power of the signal on the NPUSCH in a timeslot i, $P_{CMAX,c}$ (i) represents the maximum transmit power of the terminal device, $M_{PUSCH,c}$ (i) represents the transmission bandwidth parameter, $P_{O\_NPUSCH,c}$ (j) represents the initial transmit power, $a_c$ (j) represents the path loss estimate factor, and $PL_c$ represents a downlink path loss.

5. The method according to claim 1, wherein the first channel is the NPUSCH, the second parameter comprises a maximum transmit power of the terminal device, a transmission bandwidth parameter, a path loss, an initial transmit power and a path loss estimate factor, the transmit power of a signal on the NPUSCH that is determined based on a first parameter in accordance with the following formula:

$$P_{NPUSCH,c}(i) = \min\left\{\begin{matrix}P_{CMAX,c}(i), \\ 10\log_{10}(M_{NPUSCH,c}(i)) + P_{O\_NPUSCH,c}(j) + \alpha_c(j) \cdot PL_c\end{matrix}\right\}(dBm)$$

$P_{NPUSCH,c}$ (i) represents the transmit power of the signal on the NPUSCH in a timeslot i, $P_{CMAX,c}$ (i) represents the maximum transmit power of the terminal device, $M_{PUSCH,c}$ (i) represents the transmission bandwidth parameter, $P_{O\_NPUSCH,c}$ (j) represents the initial transmit power, $a_c$ (j) represents the path loss estimate factor, and $PL_c$ represents a downlink path loss.

6. The method according to claim 1, wherein the first channel is the NPRACH, the first parameter comprises a path loss, the maximum transmit power of the terminal device and a preamble received target power, the transmit power of the signal on the NPRACH that is determined based on the first parameter in accordance with the following formula:

$$P_{NPRACH} = \min\begin{Bmatrix} P_{CMAX,c}(i), \\ P_{PRT} + PL_c \end{Bmatrix}(dBm),$$

wherein
$P_{NPRACH}$ represents the transmit power of the signal on the NPRACH, $P_{CMAX,c}$ (i) represents the maximum transmit power of the terminal device, $P_{PRT}$ represents the preamble received target power, $PL_c$ represents the downlink path loss.

7. The method according to claim 1, wherein the first channel is the NPRACH, the second parameter comprises a path loss, the maximum transmit power of the terminal device and a preamble received target power, the transmit power of the signal on the NPRACH that is determined based on the second parameter in accordance with the following formula:

$$P_{NPRACH} = \min\begin{Bmatrix} P_{CMAX,c}(i), \\ P_{PRT} + PL_c \end{Bmatrix}(dBm),$$

wherein
$P_{NPRACH}$ represents the transmit power of the signal on the NPRACH, $P_{CMAX,c}$ (i) represents the maximum transmit power of the terminal device, $P_{PRT}$ represents the preamble received target power, $PL_c$ represents the downlink path loss.

8. A communication method, comprising:
determining, by a network device, a manner in which a terminal device determines a transmit power of a signal on a first channel, and the manner comprises one of the following:
determining the transmit power of the signal on the first channel according to a first parameter; determining the transmit power of the signal on the first channel according to a second parameter; and determining that the transmit power of the signal on the first channel is the maximum transmit power of the terminal device;
sending, by the network device, first indication information to the terminal device after determining that the terminal device determines the transmit power of the signal on the first channel based on the first parameter; and
not sending, by the network device, the first indication information to the terminal device after determining that the terminal device determines the transmit power of the signal on the first channel based on the second parameter, or after determining that the terminal device determines the transmit power of the signal on the first channel is the maximum transmit power of the terminal device;
and
the first channel is a narrowband physical uplink shared channel (NPUSCH), and wherein the determining, by the network device, transmit power of a signal on a first channel based on a second parameter, or determining, by the terminal device, wherein the transmit power of a signal on a first channel is the maximum transmit power of the terminal device comprises:
determine, by the network device, the transmit power of the signal on the first channel based on the second parameter when repetition quantity of the signal on the NPUSCH is less than or equal to a first threshold; or
determining, by the network device, the transmit power of the signal on the first channel is the maximum transmit power of the terminal device when quantity of repetition times of the signal on the NPUSCH is greater than a first threshold;
and
the first channel is an narrowband physical random access channel (NPRACH), and wherein the determining, by the network device, transmit power of a signal on a first channel based on a second parameter, or determining, by the network device, transmit power of a signal on a first channel is the maximum transmit power of the terminal device comprises:
determining, by the network device, the transmit power of the signal on the first channel based on the second parameter when coverage level of the signal on the NPRACH is less than or equal to a second level; or
determining, by the network device, the transmit power of the signal on the first channel is the maximum transmit power of the terminal device when coverage level of the signal on the NPRACH is greater than the second level.

9. The method according to claim 8, wherein the first threshold is 2.

10. The method according to claim 8, wherein the second level is coverage level 0.

11. The method according to claim 8, wherein the first channel is the NPUSCH, the first parameter comprises a maximum transmit power of the terminal device, a transmission bandwidth parameter, a path loss, an initial transmit power and a path loss estimate factor, the transmit power of a signal on the NPUSCH that is determined based on a first parameter in accordance with the following formula:

$$P_{NPUSCH,c}(i) = \min\begin{Bmatrix} P_{CMAX,c}(i), \\ 10\log_{10}(M_{NPUSCH,c}(i)) + P_{O\_NPUSCH,c}(j) + \alpha_c(j) \cdot PL_c \end{Bmatrix}(dBm),$$

wherein
$P_{NPUSCH,c}$ (i) represents the transmit power of the signal on the NPUSCH in a timeslot i, $P_{CMAX,c}$ (i) represents the maximum transmit power of the terminal device, $M_{PUSCH,c}$ (i) represents the transmission bandwidth parameter, $P_{O\_NPUSCH,c}$ (j) represents the initial transmit power, $a_c$ (j) represents the path loss estimate factor, and $PL_c$ represents a downlink path loss.

12. The method according to claim 8, wherein the first channel is the NPUSCH, the second parameter comprises a maximum transmit power of the terminal device, a transmission bandwidth parameter, a path loss, an initial transmit power and a path loss estimate factor, the transmit power of a signal on the NPUSCH that is determined based on a first parameter in accordance with the following formula:

$$P_{NPUSCH,c}(i) = \min\left\{\begin{array}{l}P_{CMAX,c}(i),\\ 10\log_{10}(M_{NPUSCH,c}(i)) + P_{O\_NPUSCH,c}(j) + \alpha_c(j) \cdot PL_c\end{array}\right\}(dBm)$$

$P_{NPUSCH,c}$ (i) represents the transmit power of the signal on the NPUSCH in a timeslot i, $P_{CMAX,c}$ (i) represents the maximum transmit power of the terminal device, $M_{PUSCH,c}$ (i) represents the transmission bandwidth parameter, $P_{O\_NPUSCH,c}$ (j) represents the initial transmit power, $a_c$ (j) represents the path loss estimate factor, and $PL_c$ represents a downlink path loss.

13. The method according to claim 8, wherein the first channel is the NPRACH, the first parameter comprises a path loss, the maximum transmit power of the terminal device and a preamble received target power, the transmit power of the signal on the NPRACH that is determined based on the first parameter in accordance with the following formula:

$$P_{NPRACH} = \min\left\{\begin{array}{l}P_{CMAX,c}(i),\\ P_{PRT} + PL_c\end{array}\right\}(dBm),$$

wherein
  $P_{NPRACH}$ represents the transmit power of the signal on the NPRACH, $P_{CMAX,c}$ (i) represents the maximum transmit power of the terminal device, $P_{PRT}$ represents the preamble received target power, $PL_c$ represents the downlink path loss.

14. The method according to claim 8, wherein the first channel is the NPRACH, the second parameter comprises a path loss, the maximum transmit power of the terminal device and a preamble received target power, the transmit power of the signal on the NPRACH that is determined based on the second parameter in accordance with the following formula:

$$P_{NPRACH} = \min\left\{\begin{array}{l}P_{CMAX,c}(i),\\ P_{PRT} + PL_c\end{array}\right\}(dBm),$$

wherein
  $P_{NPRACH}$ represents the transmit power of the signal on the NPRACH, $P_{CMAX,c}$ (i) represents the maximum transmit power of the terminal device, $P_{PRT}$ represents the preamble received target power, $PL_c$ represents the downlink path loss.

15. A communication apparatus, comprising:
  a processor, configured to determine whether first indication information is received;
  the processor, configured to, after determining that the first indication information is received, determine transmit power of a signal on a first channel based on a first parameter; or after determining that the first indication information is not received, determine transmit power of a signal on a first channel based on a second parameter, or determine transmit power of a signal on a first channel is the maximum transmit power; and
  a transmitter, configured to send the signal based on the transmit power of the signal on the first channel;
  wherein the first channel is a narrowband physical uplink shared channel (NPUSCH), and the processor specifically configured to:
    determine the transmit power of the signal on the first channel based on the second parameter when repetition quantity of the signal on the NPUSCH is less than or equal to a first threshold; or
    determine the transmit power of the signal on the first channel is the maximum transmit power when quantity of repetition times of the signal on the NPUSCH is greater than a first threshold;
  and
  the first channel is an narrowband physical random access channel (NPRACH), and the processor specifically configured to:
    determine the transmit power of the signal on the first channel based on the second parameter when coverage level of the signal on the NPRACH is less than or equal to a second level; or
    determine the transmit power of the signal on the first channel is the maximum transmit power of the apparatus when coverage level of the signal on the NPRACH is greater than the second level.

16. The apparatus according to claim 15, wherein the first threshold is 2.

17. The apparatus according to claim 15, wherein the second level is coverage level 0.

18. The apparatus according to claim 15, wherein the first channel is the NPUSCH, the first parameter comprises a maximum transmit power of the apparatus, a transmission bandwidth parameter, a path loss, an initial transmit power and a path loss estimate factor, the transmit power of a signal on the NPUSCH that is determined based on a first parameter in accordance with the following formula:

$$P_{NPUSCH,c}(i) = \min\left\{\begin{array}{l}P_{CMAX,c}(i),\\ 10\log_{10}(M_{NPUSCH,c}(i)) + P_{O\_NPUSCH,c}(j) + \alpha_c(j) \cdot PL_c\end{array}\right\}(dBm),$$

wherein
  $P_{NPUSCH,c}$ (i) represents the transmit power of the signal on the NPUSCH in a timeslot i, $P_{CMAX,c}$ (i) represents the maximum transmit power of the apparatus, $M_{PUSCH,c}$ (i) represents the transmission bandwidth parameter, $P_{O\_NPUSCH,c}$ (j) represents the initial transmit power, $a_c$ (j) represents the path loss estimate factor, and $PL_c$ represents a downlink path loss.

19. The apparatus according to claim 15, wherein the first channel is the NPUSCH, the second parameter comprises a maximum transmit power of the apparatus, a transmission bandwidth parameter, a path loss, an initial transmit power and a path loss estimate factor, the transmit power of a signal on the NPUSCH that is determined based on a first parameter in accordance with the following formula:

$$P_{NPUSCH,c}(i) = \min\left\{\begin{array}{l}P_{CMAX,c}(i),\\ 10\log_{10}(M_{NPUSCH,c}(i)) + P_{O\_NPUSCH,c}(j) + \alpha_c(j) \cdot PL_c\end{array}\right\}(dBm)$$

$P_{NPUSCH,c}$ (i) represents the transmit power of the signal on the NPUSCH in a timeslot i, $P_{CMAX,c}$ (i) represents the maximum transmit power of the apparatus, $M_{PUSCH,c}$ (i) represents the transmission bandwidth parameter, $P_{O\_NPUSCH,c}$ (j) represents the initial transmit power, $a_c$ (j) represents the path loss estimate factor, and $PL_c$ represents a downlink path loss.

20. The apparatus according to claim 15, wherein the first channel is the NPRACH, the first parameter comprises a path loss, the maximum transmit power of the apparatus and a preamble received target power, the transmit power of the signal on the NPRACH that is determined based on the first parameter in accordance with the following formula:

$$P_{NPRACH} = \min\left\{ \begin{array}{l} P_{CMAX,c}(i), \\ P_{PRT} + PL_c \end{array} \right\}(dBm),$$

wherein $P_{NPRACH}$ represents the transmit power of the signal on the NPRACH, $P_{CMAX,c}$ (i) represents the maximum transmit power of the apparatus, $P_{PRT}$ represents the preamble received target power, $PL_c$ represents the downlink path loss.

21. The apparatus according to claim 15, wherein the first channel is the NPRACH, the second parameter comprises a path loss, the maximum transmit power of the apparatus and a preamble received target power, the transmit power of the signal on the NPRACH that is determined based on the second parameter in accordance with the following formula:

$$P_{NPRACH} = \min\left\{ \begin{array}{l} P_{CMAX,c}(i), \\ P_{PRT} + PL_c \end{array} \right\}(dBm),$$

wherein $P_{NPRACH}$ represents the transmit power of the signal on the NPRACH, $P_{CMAX,c}$ (i) represents the maximum transmit power of the apparatus, $P_{PRT}$ represents the preamble received target power, $PL_c$ represents the downlink path loss.

22. A communication apparatus, comprising:
a processor, configured to determine a manner in which a terminal device determines a transmit power of a signal on a first channel, and the manner comprises one of the following:
determining the transmit power of the signal on the first channel according to a first parameter; determining the transmit power of the signal on the first channel according to a second parameter; and; determining that the transmit power of the signal on the first channel is the maximum transmit power of the terminal device;
a transmitter, configured to send first indication information to the terminal device after determining that the terminal device determines the transmit power of the signal on the first channel based on the first parameter; and;
the transmitter, configured to not send the first indication information to the terminal device after determining that the terminal device determines the transmit power of the signal on the first channel based on the second parameter, or after determining that the terminal device determines transmit power of the signal on the first channel is the maximum transmit power of the terminal device; and
wherein the first channel is a narrowband physical uplink shared channel (NPUSCH), and the processor specifically configured to:

determine the transmit power of the signal on the first channel based on the second parameter when repetition quantity of the signal on the NPUSCH is less than or equal to a first threshold; or
determine the transmit power of the signal on the first channel is the maximum transmit power of the terminal device when quantity of repetition times of the signal on the NPUSCH is greater than a first threshold; and
the first channel is an narrowband physical random access channel (NPRACH), and the processor is specifically configured to:
determine the transmit power of the signal on the first channel based on the second parameter when coverage level of the signal on the NPRACH is less than or equal to a second level; or
determine the transmit power of the signal on the first channel is the maximum transmit power of the terminal device when coverage level of the signal on the NPRACH is greater than the second level.

23. The apparatus according to claim 22, wherein the first threshold is 2.

24. The apparatus according to claim 22, wherein the second level is coverage level 0.

25. The apparatus according to claim 22, wherein the first channel is the NPUSCH, the first parameter comprises a maximum transmit power of the terminal device, a transmission bandwidth parameter, a path loss, an initial transmit power and a path loss estimate factor, the transmit power of a signal on the NPUSCH that is determined based on a first parameter in accordance with the following formula:

$$P_{NPUSCH,c}(i) =$$
$$\min\left\{ \begin{array}{l} P_{CMAX,c}(i), \\ 10\log_{10}(M_{NPUSCH,c}(i)) + P_{O\_NPUSCH,c}(j) + \alpha_c(j) \cdot PL_c \end{array} \right\}(dBm),$$

wherein $P_{NPUSCH,c}$ (i) represents the transmit power of the signal on the NPUSCH in a timeslot i, $P_{CMAX,c}$ (i) represents the maximum transmit power of the terminal device, $M_{PUSCH,c}$ (i) represents the transmission bandwidth parameter, $P_{O\_NPUSCH,c}$ (j) represents the initial transmit power, $a_c$ (j) represents the path loss estimate factor, and $PL_c$ represents a downlink path loss.

26. The apparatus according to claim 22, wherein the first channel is the NPUSCH, the second parameter comprises a maximum transmit power of the terminal device, a transmission bandwidth parameter, a path loss, an initial transmit power and a path loss estimate factor, the transmit power of a signal on the NPUSCH that is determined based on a first parameter in accordance with the following formula:

$$P_{NPUSCH,c}(i) =$$
$$\min\left\{ \begin{array}{l} P_{CMAX,c}(i), \\ 10\log_{10}(M_{NPUSCH,c}(i)) + P_{O\_NPUSCH,c}(j) + \alpha_c(j) \cdot PL_c \end{array} \right\}(dBm)$$

$P_{NPUSCH,c}$ (i) represents the transmit power of the signal on the NPUSCH in a timeslot i, $P_{CMAX,c}$ (i) represents the maximum transmit power of the terminal device, $M_{PUSCH,c}$ (i) represents the transmission bandwidth parameter, $P_{O\_NPUSCH,c}$ (j) represents the initial transmit power, $a_c(j)$ represents the path loss estimate factor, and $PL_c$ represents a downlink path loss.

27. The apparatus according to claim 22, wherein the first channel is the NPRACH, the first parameter comprises a path loss, the maximum transmit power of the terminal device and a preamble received target power, the transmit power of the signal on the NPRACH that is determined based on the first parameter in accordance with the following formula:

$$P_{NPRACH} = \min\left\{ \begin{array}{l} P_{CMAX,c}(i), \\ P_{PRT} + PL_c \end{array} \right\}(dBm),$$

wherein $P_{NPRACH}$ represents the transmit power of the signal on the NPRACH, $P_{CMAX,c}(i)$ represents the maximum transmit power of the terminal device, $P_{PRT}$ represents the preamble received target power, $PL_c$ represents the downlink path loss.

28. The apparatus according to claim 22, wherein the first channel is the NPRACH, the second parameter comprises a path loss, the maximum transmit power of the terminal device and a preamble received target power, the transmit power of the signal on the NPRACH that is determined based on the second parameter in accordance with the following formula:

$$P_{NPRACH} = \min\left\{ \begin{array}{l} P_{CMAX,c}(i), \\ P_{PRT} + PL_c \end{array} \right\}(dBm),$$

wherein $P_{NPRACH}$ represents the transmit power of the signal on the NPRACH, $P_{CMAX,c}(i)$ represents the maximum transmit power of the terminal device, $P_{PRT}$ represents the preamble received target power, $PL_c$ represents the downlink path loss.

* * * * *